Nov. 26, 1940.  A. W. LE FEVRE  2,223,178
AUTOMOBILE HEATER
Filed Sept. 22, 1938
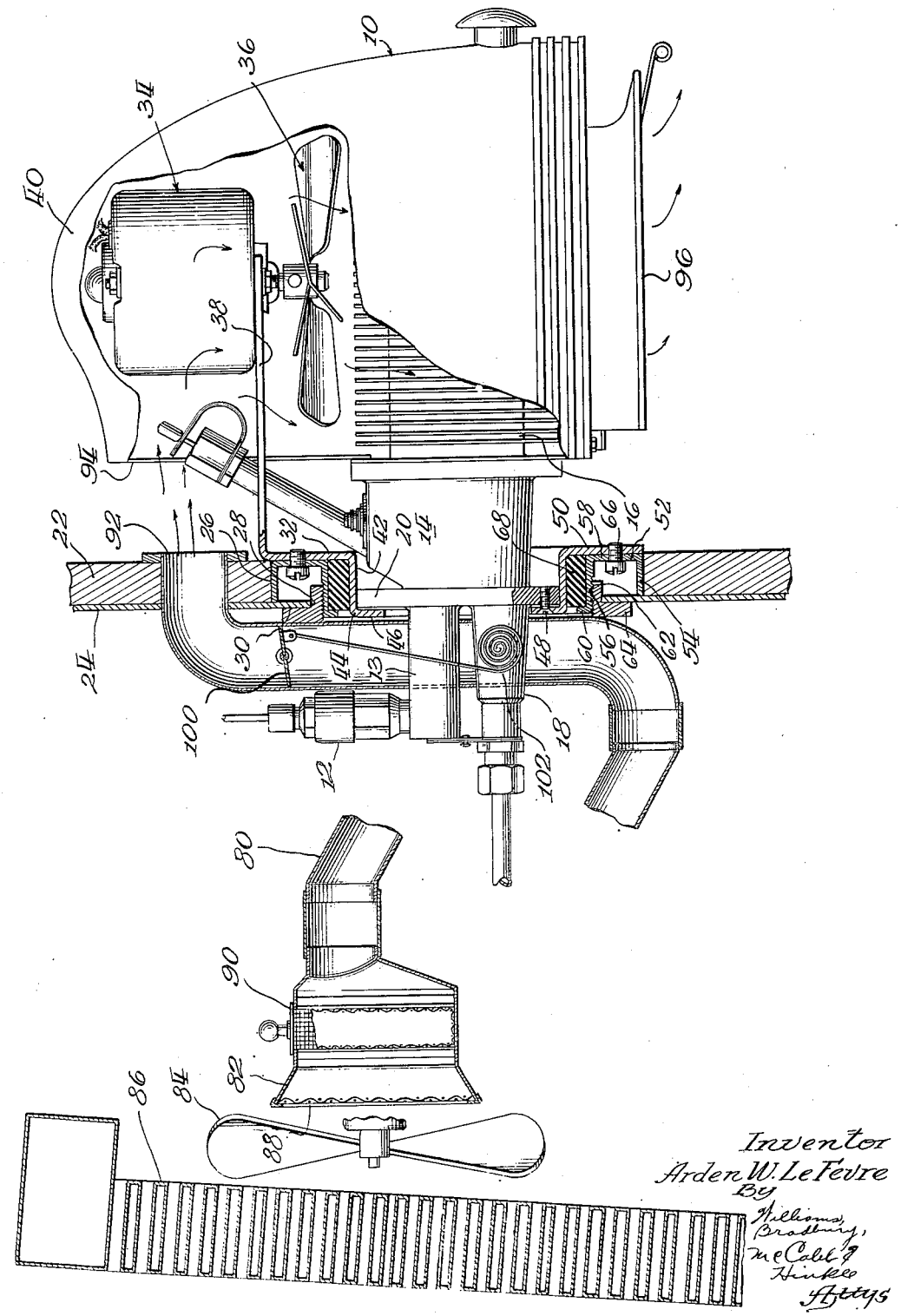
Inventor
Arden W. Le Fevre
By
Williams,
Bradbury,
McCall &
Hinkle
Attys Patented Nov. 26, 1940

2,223,178

UNITED STATES PATENT OFFICE 2,223,178

AUTOMOBILE HEATER

Arden W. Le Fevre, Chicago, Ill., assignor to Stewart-Warner Corporation, Chicago, Ill., a corporation of Virginia Application September 22, 1938, Serial No. 231,234

4 Claims. (Cl. 237—2)

The invention relates to heaters for motor vehicles.

One of the objects of the invention is to provide an improved mounting for an internal combustion heater.

Another object of the invention is to provide an improved fresh air supply for the interior of automobiles which is controlled and heated by waste heat developed in an internal combustion heater.

Another object of the invention is to provide an improved construction for internal combustion heaters wherein waste heat is utilized to heat the mixing chamber thereof and also the fresh air supplied to the interior of the compartment.

Another object of the invention is to provide an improved heater construction wherein fresh air is circulated over the exhaust conduit of the heater in heat exchange relationship therewith and introduced into the passenger compartment when the temperature of the air has been raised to a predetermined degree.

Another object of the invention is to provide an improved heater construction wherein heat is conveyed by air from the exhaust conduit of an internal combustion heater in a mixing chamber to warm the latter until such time as the heat developed in both are sufficient to heat the air a predetermined degree for admission to the passenger compartment of a motor vehicle.

Another object of the invention is to provide an improved mounting for an internal combustion heater wherein the heat developed in the heater is insulated from the dash and the heater may be installed or removed in a single operation.

Another object of the invention is to provide an article of the class described which is simple in construction and operation, effective in its use, and inexpensive to manufacture.

These being among the objects of the invention, other and further objects will become apparent from the drawings herein, the description relating thereto, and the appended claims.

Referring now to the single view of the accompanying drawing wherein a preferred embodiment of the invention is shown partly in side elevation and partly in enlarged vertical section, the internal combustion heater is indicated generally by the numeral 10, and reference may be had to the co-pending application of Henry J. De. N. McCollum, Serial No. 61,213, filed January 28, 1936, for the structural characteristics thereof, wherein, briefly, air and fuel supplied by the carburetor 12 are drawn through the mixing chamber 13 into the combustion chamber 14 where the mixture is ignited to form hot gases which are then drawn through the radiator unit 16 and discharged through the tube 18 into the intake manifold (not shown) of an automobile engine by the vacuum developed therein.

The mixing chamber 13 and the exhaust conduit 18 are cast integrally with the combustion chamber 14 and the casting is provided with an intermediate circular flange 20 for supporting the heater as hereinafter described. In mounting the heater 10 upon the dash 22, which includes a metal sheathing 24 upon the engine compartment side thereof, a circular hole 26 is cut through the insulated portion of the dash from the inside of the passenger compartment to the metal sheathing 24 and an opening 28 is cut through the metal sheathing 24 of a lesser diameter than the opening 26. This provides a flange 30 of metal sheathing 24 around the opening 26.

A back plate 32 supports the motor 34 and fan 36 upon an arm 38 inside the shell 40 of the heater and is provided with a cylindrical portion 42 in which the flange 20 is inserted when being assembled therewith. At the marginal edge of the opening 42 the back plate is bent as at 44 to provide an inwardly extending flange 46 which abuts against the engine side of the flange 20 to which it is secured by flush screws 48.

A channel collar 52 having two radially spaced cylindrical portions 54 and 56 connected by a webbed portion 58 is secured face to face by screws 66 to the back plate 32. The edge of the inner cylindrical member 56 which is remote from the webbed portion 58 is upset to form an inwardly directed flange 60 and is threaded upon the outer surface thereof as at 62 for threaded engagement with an internally threaded collar 64.

The outer cylindrical portion 54 of the channel collar 52 is of a diameter to be received closely within the opening 26 of the dash, and the inner cylindrical portion 56 is of a diameter greater than the cylindrical portion 42 of the back plate, but of a diameter slightly less than the opening 28, so that a moulded asbestos gasket 68 may be inserted between the cylindrical portion 42 and the cylindrical portion 56 where it is held in place by the flange 60 under the securement exerted by the screws 66.

The outer diameter of the cylindrical portion of the internally threaded collar 64 is snugly received in the opening 28 and when the collar 64 is tightened into place upon the threaded portion 62 the outer cylindrical flange 54 is drawn inwardly against the metal casing 24 in a manner whereby the flange 30 of the dash is clamped between the flange of the internally threaded collar 64 and the inner edge of the outer cylindrical portion 54.

In this way only a single hole need be provided in the dash of an automobile in which the heater is to be mounted and the mounting assembly may be readily assembled and insulated from the wooden portion of the dash 22. The carburetor 12, the mixing chamber 13, and the exhaust conduit 18, may be inserted through the opening 28 by tilting the heater and the internally threaded collar received through the opening 28 and tightened into place by a spanner wrench in one single operation. If upon occasion the heater is removed from the automobile during the summer time it may be done in a single operation and only one opening remains to be closed by a closure plate.

In the particular embodiment disclosed, I prefer to employ a fresh air conduit 80 having a flared end portion providing a mouth 82 facing the air-stream of the cooling fan 84 which is driven by the engine to draw air through the conventional cooling radiator 86. A screen 88 is provided in the mouth 82 to remove dirt and other particles from the air and a filter cartridges 90 is located in the path of the air entering the conduit 80 to remove obnoxious gases and odors from the air passing therethrough.

The conduit 80 carries the air first over the exhaust conduit 18 of the internal combustion engine, then over the mixing chamber 13 in heat exchange relationship therewith and finally expels it as at 92 through an opening in the dash 22 immediately in front of the intake opening 94 of the heater 10. Both the fresh air thus supplied and the recirculated air coming from the passenger compart are mixed in the motor and fan compartment to be heated by the radiator and exhausted into the interior of the compartment through the outlet 96 of the heater 10.

A butterfly valve 100 is provided in the conduit 80 and is controlled by a thermostat 102 mounted preferably adjacent the exhaust conduit 18 of the heater. When the air in the conduit reaches a certain temperature the thermostat acts to open the valve 100 to permit fresh air forced by the fan 84 to flow into the compartment of the automobile and this fresh air is heated in one of two ways before entering the compartment, namely, by the heat from the cooling system radiator 86 plus the heat of the exhaust conduit 18 and mixing chamber 13, or by only the heat from the exhaust conduit 18 and the mixing chamber 13, it being appreciated that in the latter case the mouth 82 would not be mounted in the engine compartment immediately behind the radiator 86.

In operation, air present in the conduit 80 circulates by convection around the exhaust conduit 18 and the mixing chamber 13 until such time as the temperature of both of these units is sufficient to heat the air to a degree bringing the thermostat 102 into operation to open the valve 100. During this time, particularly when the heater 10 is just turned on, the hot gases of combustion passing through the exhaust conduit 18 will be transferred by said convective circulation of air into the mixing chamber in a manner warming the latter so that a better mixture and combustion may be obtained in the heater. After a short period of time, due to the fact that the mixing chamber and the exhaust conduit 18 are integrally cast with the combustion chamber 14, the mixing chamber 13 will become sufficiently heated to carry on its own function independently of the heat of the exhaust chamber 18 and the heat will begin to mount and ultimately bring the thermostat 102 into operation at a time when the air can be circulated through the conduit 80 into the compartment with absolute comfort to the passengers therein.

In this way an improved heater construction is provided for passenger compartments of automobiles which can be readily mounted in place by a single operation and provides not only heated recirculated air for the interior of the compartment but also warm, fresh air which is properly filtered of obnoxious odors for the comfort of the passengers therein. Moreover, heat of the exhaust chamber which is otherwise wasted in the engine compartment, where the exhaust conduit is located, is utilized for warming the air and the efficiency of the fuel employed for heating the radiator 16 is thereby increased for the added comfort of the passengers of the compartment.

It will be understood that the improved mounting means for the heater may be used even though the thermostatically controlled means for admitting fresh air to the heater is not employed, or a different means for this purpose is supplied. The conduit 80 and its associated parts are preferably made in such form that they may be readily attached to a heater of standard construction, or may be omitted if not desired in any particular installation.

Consequently, although a single embodiment of the invention has been shown and described herein, it will be apparent to those skilled in the art that various and further uses, modifications and changes may be made without departing from the spirit and substance of the invention, the scope of which is commensurate with the appended claims.

What is claimed is:

1. In a heater of the class described having a heat exchange unit, a mounting flange dividing said unit into two portions, means for securing said flange in an opening in a wall to locate and seal said portions from each other on opposite sides of said wall, means for circulating air from one side of said wall over one of said portions, means for circulating air from the other side of said wall over the other of said portions and supplying air thus circulated to the first said air circulating means, and means responsive to the heat developed by said other of said portions for controlling the flow of air supplied to the first of said circulating means.

2. In a heater of the class described having an internal combustion heat generating unit, means for circulating air over said generator in heat exchange relationship, means supplying said unit with combustible elements, means for circulating the hot gases of combustion through said generator in heat exchange relationship, including a conduit means removing gases of combustion having residuary heat, means for circulating air over the last named means and said supplying means, successively, to convey residuary heat to said supplying means and to said first named circulating means, and heat responsive means exposed to said residuary heat for controlling the flow of residuary heat laden air to said first named circulating means.

3. In a heater of the class described having an internal combustion heat generating unit, means for circulating air over said generator in heat exchange relationship, means supplying said unit with combustible elements, means for circulating the hot gases of combustion through said generator in heat exchange relationship including a conduit means removing gases of combustion having residuary heat, means convectively circulating air over the last named means and said supplying means to transfer said residuary heat to said supplying means, a second conduit means for conveying air heated by said supplying means and the first conduit means to said first named circulating means, and heat responsive means exposed to said residuary heat for controlling the flow of residuary heat laden air to said first named circulating means.

4. In an automobile heater adapted to be mounted on a vertical partition forming part of the automobile body, the combination of a flange for mounting the heater on said partition, a heat exchange unit divided into two major portions by said mounting flange, means for circulating air over one of said portions, means for circulating air over the other of said portions, and means responsive to the heat developed by said other of said portions for controlling the flow of air supplied to the first of said circulating means.

ARDEN W. LE FEVRE.